(12) United States Patent
Gupta et al.

(10) Patent No.: US 11,591,212 B2
(45) Date of Patent: Feb. 28, 2023

(54) SYSTEMS AND PROCESSES FOR MOLTEN MEDIA PYROLYSIS

(71) Applicant: ExxonMobil Technology and Engineering Company, Annandale, NJ (US)

(72) Inventors: Ramesh Gupta, Berkeley Heights, NJ (US); Sumathy Raman, Annandale, NJ (US); Hugo S. Caram, Allentown, PA (US); David C. Dankworth, Princeton, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 373 days.

(21) Appl. No.: 16/540,277

(22) Filed: Aug. 14, 2019

(65) Prior Publication Data

US 2020/0071162 A1 Mar. 5, 2020

Related U.S. Application Data

(60) Provisional application No. 62/724,809, filed on Aug. 30, 2018.

(51) Int. Cl.
| | | |
|---|---|---|
| *C01B 32/05* | (2017.01) | |
| *C01B 3/24* | (2006.01) | |
| *C01B 3/34* | (2006.01) | |
| *C01B 3/26* | (2006.01) | |

(52) U.S. Cl.
CPC ............. *C01B 3/24* (2013.01); *C01B 3/26* (2013.01); *C01B 3/348* (2013.01); *C01B 32/05* (2017.08); *C01B 2203/0277* (2013.01); *C01B 2203/1035* (2013.01); *C01B 2203/1047* (2013.01)

(58) Field of Classification Search
CPC ...................................................... C01B 32/05
See application file for complete search history.

(56) References Cited

U.S. PATENT DOCUMENTS

| | | | |
|---|---|---|---|
| 5,301,620 | A | 4/1994 | Nagel et al. |
| 10,851,307 | B2 * | 12/2020 | Desai .................. C01B 32/05 |
| 10,882,743 | B2 * | 1/2021 | O'Connor .............. C01B 32/15 |
| 2008/0206129 | A1 | 8/2008 | Vygonyaylo et al. |
| 2013/0157846 | A1 | 6/2013 | Carr et al. |
| 2013/0228721 | A1 | 9/2013 | Collins et al. |
| 2015/0151274 | A1 | 6/2015 | Lee et al. |

FOREIGN PATENT DOCUMENTS

WO 2018141911 A1 8/2018

OTHER PUBLICATIONS

Upham, D. Chester, et al; "Catalytic Molten Metals for the Direct Conversion of Methane to Hydrogen and Separable Carbon"; Science Magazine; 2017; vol. 358; pp. 917-921.
The International Search Report and Written Opinion of PCT/US2019/046455 dated Jan. 10, 2020.
Plevan et al., "Themal cracking of methane in a liquid metal bubble column reactor: Experiments and kinetic analysis", Int. J. of Hydrogen Energy 40 (2015) 8020-8033.
Geisler et al., "Experimental investigation and thermo-chemical modeling of methane pyrolysis in a liquid metal bubble column reactor with a packed bed", Int. J. of Hydrogen Energy 40 (2015) 14134-14146.
Abanades et al., "Development of methane decarbonisation based on liquid metal technology for CO2-free production of hydrogen", Int. J. of Hydrogen Energy 41 (2016) 8159-8167.
Parkinson et al., "Hydrogen production using methane: Techno-economics of decarbonizing fuels and chemicals", Int. J. of Hydrogen Energy 43 (2018) 2540-2555.
Parkinson et al., "CO2 Free Hydrogen, Iron and Petrochemicals" Dow Centre for Sustainable Engineering Innovations. Princeton, New Jersey. Jun. 19, 2017. Presentation.
International Search Report and Written Opinion received for PCT Patent Application No. PCT/US2019/046459, dated Nov. 18, 2019, 12 pages.
Non-Final Office Action dated Dec. 14, 2021 in U.S. Appl. No. 16/540,300, 6 pages.
International Preliminary Report on Patentability received for PCT Application No. PCT/US2019/046455, dated Mar. 11, 2021, 10 pages.
Notice of Allowance dated Oct. 14, 2022 in U.S. Appl. No. 16/540,300, 7 pages.
International Preliminary Report on Patentability received for PCT Application No. PCT/US2019/046459, dated Mar. 11, 2021, 10 pages.
Non-Final Office Action dated Jul. 14, 2022 in U.S. Patent Application No. 16/540,300, 4 pages.
Invitation to pay additional fees received for PCT Patent Application No. PCT/US2019/046455, dated Nov. 19, 2019, 9 pages.
Final Office Action dated Apr. 20, 2022 in U.S. Appl. No. 16/540,300, 5 pages.

* cited by examiner

*Primary Examiner* — Stuart L Hendrickson
(74) *Attorney, Agent, or Firm* — Shook, Hardy & Bacon L.L.P.

(57) ABSTRACT

Systems and methods for molten media pyrolysis for the conversion of methane into hydrogen and carbon-containing particles are disclosed. The systems and methods include the introduction of seed particles into the molten media to facilitate the growth of larger, more manageable carbon-containing particles. Additionally or alternatively, the systems and methods can include increasing the residence time of carbon-containing particles within the molten media to facilitate the growth of larger carbon-containing particles.

10 Claims, 4 Drawing Sheets

SYSTEMS AND PROCESSES FOR MOLTEN MEDIA PYROLYSIS

CROSS-REFERENCE TO RELATED APPLICATIONS

This application claims priority to U.S. Provisional Application No. 62/724,809 filed Aug. 30, 2018, which is herein incorporated by reference in its entirety.

FIELD

Systems and methods for hydrogen production by methane pyrolysis in liquid phase media are provided.

BACKGROUND

Conventionally, various gas phase methods have been used for conversion of methane or other light hydrocarbons to hydrogen. Examples of such methods include reforming and gas phase pyrolysis. While such gas phase methods are effective for producing hydrogen, such methods typically also result in production of carbon oxides and/or coke. Because coke removal from the processing environment typically also results in production of carbon oxides, the net result is that production of hydrogen is accompanied by a corresponding production of carbon oxides. It would be desirable to develop methods for conversion of light hydrocarbons to hydrogen while reducing or minimizing production of carbon oxides.

Pyrolysis in a molten media environment, e.g., in a molten metal and/or molten salt, provides a potential alternative for conversion of methane and/or light hydrocarbons to hydrogen. Performing pyrolysis in a molten media environment can reduce or minimize formation of carbon oxides during hydrogen production. Instead, the carbon from the methane and/or light hydrocarbons can be substantially converted into carbon particles. It would be desirable to develop further improvements for molten media processing of light hydrocarbons.

Parkinson et al., Hydrogen Production using Methane: Techno-Economics of decarbonizing Fuels and Chemicals, Int. J. Hydrogen Energy 2018; 43(5):2540-2555, describes a theoretical system for liquid metal pyrolysis of methane. The theoretical system included a reactor housing a liquid molten metal with a molten salt layer on top of the molten metal.

SUMMARY

In one aspect, a process for molten media pyrolysis is provided. The process can include exposing methane gas to molten media and seed particles in a volume of a reaction vessel under effective conditions to convert at least a portion of the methane gas into hydrogen and carbon-containing particles. The carbon-containing particles can include carbon-containing particles having an average characteristic dimension of 0.2 mm or more. The process can also include removing at least a portion of the carbon-containing particles having an average characteristic dimension of 0.2 mm or more.

In another aspect, a system for molten metal pyrolysis is provided. The system can include a reaction vessel comprising an inner volume having a molten metal present in a first layer and a molten salt present in a second layer. The first layer of the molten metal can be positioned between a bottom surface of the reaction vessel and the second layer of the molten salt. The system can further include a methane gas source in fluid communication with the inner volume of the reaction vessel. Additionally, the system can include a cooling vessel in fluid communication with the reaction vessel. The cooling vessel can be adapted to receive at least a portion of the molten metal from the reaction vessel and reduce the temperature of the at least a portion of the molten metal. Further, the system can include a conduit in fluid communication with the cooling vessel and with the inner volume of the reaction vessel and adapted to return the at least a portion of the molten metal to the inner volume of the reaction vessel.

In yet another aspect, a carbon-containing composition is provided. The carbon-containing composition can include a carbon particle that includes a core and an outer layer. The core can include a coke particle having a hydrogen to carbon ratio of about 0.1 or more. The outer layer can include elemental carbon and have a hydrogen to carbon ratio of about 0.05 or less. The carbon particle can include a characteristic dimension of about 0.2 mm or more.

In another aspect, a carbon-containing composition is provided. The carbon-containing composition can include a carbon particle that includes a core and an outer layer. The core can include $SiO_2$ and have an oxygen content of 40% or more. The outer layer can include elemental carbon and have an oxygen content of about 5% or less.

DETAILED DESCRIPTION

Overview

Figure 1:
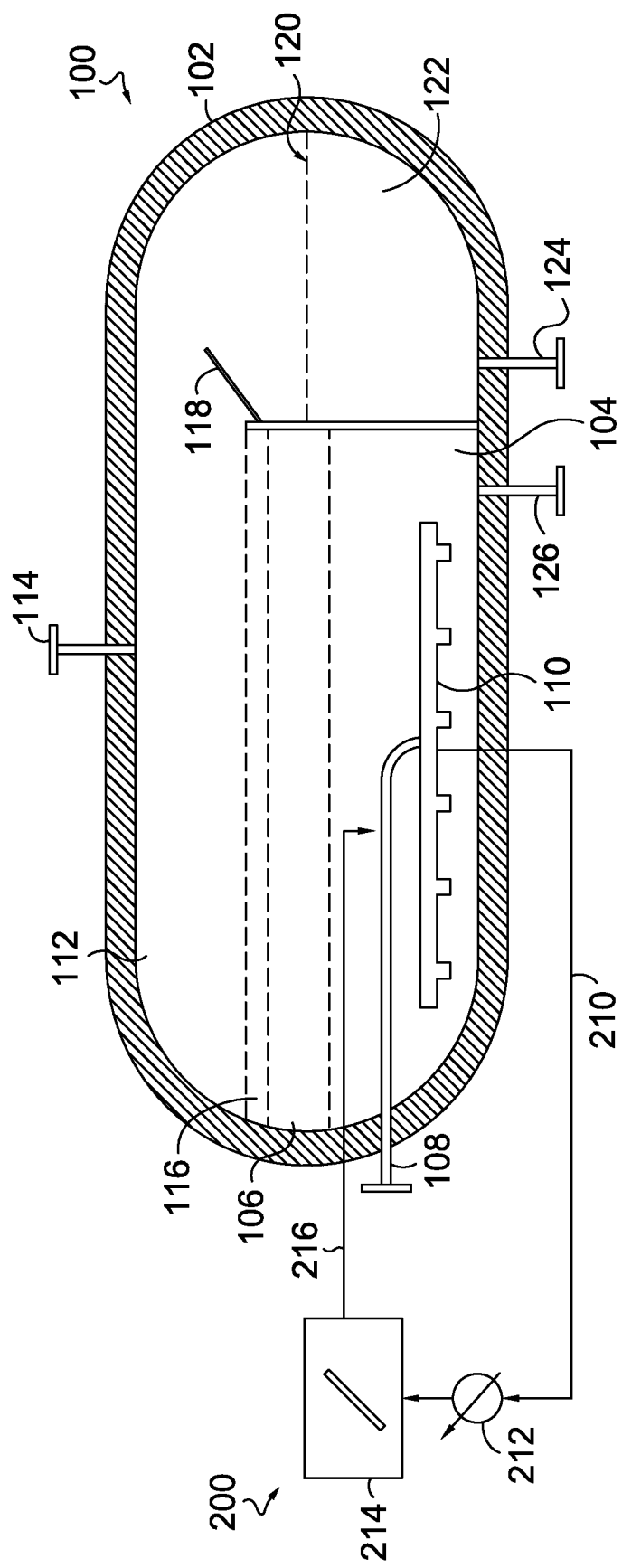
FIG. 1 depicts an example system for molten metal pyrolysis that includes a reactor coupled to an optional cooling vessel.

In various aspects, systems and methods for molten media pyrolysis of methane are provided. In various aspects, the systems and methods can utilize a reactor containing a molten metal as the reaction media, and optionally a molten salt on top of the molten metal. In an alternative aspect, the systems and methods can utilize a reactor containing a molten salt as the reaction media. In one or more aspects, methane can be converted to hydrogen and carbon-containing particles using systems and/or methods adapted to produce larger carbon-containing particles, e.g., carbon-containing particles having an average characteristic dimension of 0.2 mm or more.

Certain conventional molten metal pyrolysis systems for converting methane into hydrogen and carbon produce carbon-containing particles that are too small e.g., 30 microns or less, for their efficient management. For instance, substantial amounts of fine carbon-containing particles can be formed, which may accumulate on system equipment thereby requiring substantial process downtime for cleaning. Further, at commercial scale production levels, several tons of these fine, smaller carbon-containing particles may be produced daily. Separating such particles from the molten salt and/or molten metal and their subsequent handling (e.g., pelletizing the carbon-containing particles) would be resource intensive, such that commercial scale production would be unsustainable.

The systems and processes disclosed herein can alleviate one or more of these issues. For example, the molten media pyrolysis systems and processes disclosed herein are adapted to increase the resulting carbon-containing particle size to larger, more manageable sizes. For instance, as discussed above, average conventional carbon-containing particles sizes obtained from conventional molten metal pyrolysis are in the range of 30 microns or smaller. The inventive molten media pyrolysis systems and processes produce carbon-containing particles having a significantly larger average particle size. For instance, the carbon-containing particles produced in the inventive molten media pyrolysis systems and processes can have an average characteristic dimension of about 0.2 mm or more, about 0.3 mm or more, or about 0.5 mm or more, or from about 0.2 mm to about 5 mm, from about 0.3 mm to about 5 mm, or from about 0.5 mm to about 5 mm.

The increase in average characteristic dimension for the carbon-containing particles can be achieved based on one or more improvements in the processing conditions and/or the reactor configuration. In certain aspects, a molten media pyrolysis system and process is disclosed that converts methane to hydrogen and larger carbon-containing particles by introducing seed particles into the pyrolysis reactor. In such aspects, the seed particles can facilitate carbon particle growth to larger, more manageable sizes, e.g., particles having an average characteristic dimension of about 0.2 mm or more. Additionally, the seed particles can act as a catalyst for methane conversion to hydrogen, i.e., increase the reaction rate at which methane converts to hydrogen.

Additionally or alternatively, a molten media pyrolysis system is disclosed that converts methane to hydrogen and larger, more manageable carbon-containing particles by increasing the residence time of the carbon-containing particles in the molten metal and/or molten salt. In such aspects, this increased residence time allows the carbon-containing particles more time to interact with other elemental carbon or carbon-containing particles present in the molten metal and/or molten salt to thereby produce larger carbon-containing particles. The residence time of the carbon-containing particles in the molten media can be increased by reducing the rise velocity through the molten metal within the reactor. Further, in certain aspects, the residence time of the carbon-containing particles in the molten media can be increased by using a pumping axial flow impeller within the reactor to entrain and suspend carbon-containing particles below a threshold size, thereby allowing smaller particles to grow to a larger size. In various aspects, the residence time of the carbon-containing particles in the molten media can be increased by inducing liquid circulation currents within the reactor via rising methane gas bubbles, where such currents can entrain smaller carbon-containing particles allowing time for such particles to grow to a larger size.

Unless otherwise specified herein, the term "average characteristic dimension" refers to an average of the individual characteristic dimensions for a population of particles, where a characteristic dimension is the diameter of the smallest bounding sphere that can enclose the particle.

Molten Metal Pyrolysis System and Seed Particle Addition

In various aspects, a molten media pyrolysis system can be used to expose methane to molten metal and/or molten salt in a reactor environment for conversion of methane to hydrogen and carbon-containing particles. The reactor can be made from any type of material that is capable of withstanding the high temperatures of the pyrolysis process, such as a vessel lined with magnesia-carbon bricks utilized in the steel industry. In aspects, the reactor may include any convenient protective lining to minimize corrosion. In certain aspects, the reactor can include a bottom surface an opposing top surface, and at least one sidewall extending from the bottom surface to the top surface. It should be understood that the bottom surface may be flat, a point, or rounded. In aspects, the top and bottom surface are aligned with the direction of gravity such that the bottom surface would be positioned closer to the ground than the opposing top surface.

In aspects, the molten media can be a molten metal, which can include iron, nickel, aluminum, lead, bismuth, tin, alloys, or a combination thereof, or any other metal that exhibits suitable catalytic activity for facilitating a pyrolysis reaction. In aspects, the molten metal can include a mechanical mixture of a metal and a solid media, such as silicon carbide. In certain aspects, the molten metal is kept at a temperature sufficient to provide adequate conversion kinetics for substantial conversion of methane to hydrogen and carbon-containing particles. In such aspects, the molten metal can be maintained at a temperature in the range of about 600° C. to about 1200° C., about 800° C. to about 1100° C., or about 800° C. to about 1050° C. In certain aspects, the methane or natural gas can be pressurized, such as a pressure in the range 2500-4000 kPa, or higher.

In certain aspects, a layer of molten salt may be present on top of the molten metal in the reactor in order to maintain the temperature of the molten metal inside the reactor. In aspects, in order for the molten salt to maintain the temperature of the molten metal, a stream of molten salt may be withdrawn from the reactor, heated to a temperature higher than the molten metal in the reactor, and then returned to the reactor, thereby allowing for transfer of the thermal energy from the returned heated molten salt to the molten metal. In one aspect, the molten salt can include $MgCl_2$, NaCl, an iron salt, an aluminum salt, a nickel salt, a lead salt, a bismuth salt, a tin salt, or a combination thereof. The anions of the molten salt are not limited to chloride and can include bromide, iodide, or polyatomic anions.

In aspects, in addition to maintaining the temperature of the molten metal inside the reactor, the layer of molten salt may also function as a reaction media, along with the molten metal present in the reactor.

As discussed above, in alternative aspects, the molten media can include a molten salt as the reaction media. In this alternative aspect, the molten salt is not functioning as a heat source for a molten metal reaction media; instead, the molten salt itself may be the reaction media. In such aspects, the molten salt can include an iron salt, a nickel salt, a lead salt, an aluminum salt, a bismuth salt, a tin salt, or any other salt that has suitable catalytic activity for facilitating a pyrolysis reaction. In one aspect, the molten salt can be present in the reactor at a temperature in the range of about 600° C. to about 1200° C., about 800° C. to about 1100° C., or about 800° C. to about 1050° C. In certain aspects, a particular molten salt can be selected to minimize oxidative reactions and/or to minimize corrosiveness of the reactor. In aspects, a particular molten salt can be selected based on its melting point being below the operating temperature in the reactor, such as below about 600° C., below about 800° C., or below about 1200° C.

In yet another alternative aspect, the molten media may include a mixture of molten metal and molten salt as the reaction media. In such aspects, the molten metal and molten salt may include one or more of the same or similar metals and salts mentioned above.

In operation, methane gas can be introduced into the molten metal and/or molten salt to allow for conversion into hydrogen and carbon-containing particles. In one aspect, the methane feed per unit reactor volume per time can be about 0.1 kg/m³/min-10 kg/m³/min, or about 0.2 kg/m³/min-5 kg/m³/min.

Upon conversion of the methane, the hydrogen moves through the molten metal and/or molten salt and can be captured for various downstream uses. In the molten metal reaction environment, while the carbon-containing particles may be soluble to some extent in the reaction media, the carbon-containing particles exhibit a density that is lower than the molten metal density and tend to rise to the surface of the molten metal. In the molten salt environment, the carbon-containing particles may also be less dense than the reaction media, and additionally, may not be soluble in the molten salt, thereby causing the carbon-containing particles to rise to the surface. Further, the carbon-containing particles can adhere to the methane gas and/or hydrogen gas bubbles as they rise through the reaction media, further increasing the rise velocity of the carbon-containing particles. Conventionally, the average rise rate is fast enough and/or the particle nucleation rate is slow enough, so that by the time the particles rise to the surface where they can be separated, the average particle size is typically 30 microns or less. This small particle size can pose a variety of challenges in a commercial production setting. As a result, separation of the smaller particles from a molten salt can require more resources (time and/or equipment) than would be required for separating out larger carbon-containing particles. In order to reduce or minimize the difficulties related to small average particle size, various methods and systems can be used to create larger, more manageable carbon-containing particles, e.g., carbon-containing particles having an average characteristic dimension of about 0.2 mm or more.

An example molten metal pyrolysis system 100 is depicted in FIG. 1. It should be understood that the system 100 depicted in FIG. 1 is just one example of a molten metal pyrolysis system and that other designs of molten metal pyrolysis systems are also contemplated for use in various aspects of the disclosure herein. Further, it should be understood that while the system 100 is described with reference to molten metal as the reaction media, a molten salt can also be utilized as the reaction media in this system 100. The system 100 includes a pyrolysis reactor vessel 102. The system 100 also includes a molten metal layer 104 within the pyrolysis reactor vessel 102, and a molten salt layer 106 above the molten metal layer 104.

Further, the system 100 includes a conduit 108 coupled to a natural gas or methane source to supply methane to the pyrolysis reactor vessel 102. In one or more aspects, the conduit 108 can be coupled to a gas sparger 110 that is present inside the pyrolysis reactor vessel 102. The sparger creates small bubbles of the methane which rise through the molten metal and thus provide for effective contact between the methane or natural gas and the molten metal layer 104. In aspects, the sparger can be any conventional sparger that is capable of withstanding the reaction conditions described herein.

In aspects, once the methane or natural gas is introduced into the molten metal layer 104, the methane is converted into hydrogen gas and carbon-containing particles. Under operating conditions, the hydrogen gas will rise up into the overhead space 112 (above the liquid layers in the reactor) and can be collected via a conduit 114. The collected hydrogen can be used as a fuel or for other downstream processes. In one aspect, a portion of the hydrogen can be used to provide heat to the molten salt layer 106 and/or the molten metal layer 104.

In aspects, elemental carbon resulting from the conversion of methane can dissolve and accumulate into the molten metal layer 104. When the dissolved carbon in the molten metal layer 104 exceeds its solubility limit in the molten metal, the carbon-containing particles may precipitate as small particles which rise into the molten salt layer 106, where such carbon-containing particles can be insoluble in the molten salt layer 106 and form a carbon particle layer 116. In aspects, as the carbon-containing particles accumulate in the layer 116, they may spill over an internal baffle 118 into a separated volume 120 within the pyrolysis reactor vessel 102. In such aspects, in addition to the carbon-containing particles spilling over the internal baffle 118, a portion of the molten salt layer 106 may also spill over into the separated volume 120 within the pyrolysis reactor vessel 102. In the same or alternative aspects, at least a portion of the carbon-containing particles in the carbon particle layer 116 can be skimmed and removed from inside the pyrolysis reactor vessel 102.

In various aspects, the carbon particle and molten salt mixture 122 can be withdrawn from the pyrolysis reactor vessel 102, e.g., via conduit 124, for separating out the carbon-containing particles, for re-heating the molten salt to return to the pyrolysis reactor vessel 102, or both. In aspects, the carbon-containing particles can be removed from the molten salt using any convenient techniques, such as filtration, skimming, settling, or a combination thereof. In aspects, such separation techniques may require the cooling of the mixture 122 to a suitable temperature, though such temperature may maintain the salt in a molten state.

The molten salt separated from the mixture 122 can be re-heated up to a temperature that can maintain the molten metal layer 104 at the reaction temperatures described above and recirculated back to the pyrolysis reactor vessel 102, e.g., via a conduit 126. While FIG. 1 depicts the re-heated molten salt returning via a conduit 126 that exits into the molten metal layer 104, it should be appreciated that the re-heated molten salt may be returned directly to, or adjacent to, the molten salt layer 106.

One option for increasing the average particle size of the carbon-containing particles can be to provide seed particles in the molten metal environment. Without being bound by any particular theory, it is believed that one of the factors that leads to small particle size in conventional molten metal pyrolysis systems is the time required for particle nucleation. By providing seeds in the molten metal environment, the nucleation time can be avoided, allowing for larger particle growth prior to reaching the top of the molten metal layer. Additionally, in some aspects, the nature of the seed particles can potentially enhance the rate of growth of the resulting carbon-containing particles.

FIG. 1 further depicts an optional system 200 for forming seed particles in situ, which can be utilized to facilitate the growth of larger carbon-containing particles. The system 200 includes a conduit 210 for transporting a portion or stream of the molten metal saturated with carbon to a cooler 212, a holding tank 214, and a conduit 216 for transporting the in situ generated seed particles back to the pyrolysis reactor vessel 102. In various aspects, transporting the in situ generated seed particles back to the pyrolysis reactor vessel 102 may include transporting the in situ generated seed particles along with a portion of the molten metal.

In aspects, the cooler 212 can be any type of cooling apparatus that is capable of cooling the molten metal, such as heat exchangers. In aspects, the molten metal is cooled to a temperature suitable for decreasing the carbon solubility in the molten metal to facilitate the precipitation of the elemental carbon therein. It should be appreciated that the target cooling temperature is dependent on the saturation level of the carbon and on the compositional nature of the molten metal so that such cooling does not cause the solidification of the metal. In aspects, the molten metal can be cooled to a temperature below the temperature of the molten metal in the pyrolysis reactor vessel 102.

In aspects, the holding tank 214 can be any tank suitable for containing molten metal saturated with carbon. In one or more aspects, the holding tank 214 can include a mixer to facilitate the precipitation of the carbon into seed particles. It should be understood that controlling the target cooling temperature and shear rate or mixing rate of the molten metal saturated with carbon can control the morphology and size of the seed particles and specific conditions can be chosen for a particular purpose. In aspects, the in situ generated seed particles can have an average characteristic dimension of 50 microns or more, 75 microns or more, or 100 microns or more. Once the seed particles have been formed, such seed particles can be transported to the pyrolysis reactor vessel 102 to facilitate the growth of larger carbon-containing particles. In various aspects, the amount of in situ generated seeds (in grams) per unit reactor volume per unit time that may be added can be in the range of about 5 g/m$^3$/min to about 500 g/m$^3$/min. It should be understood that the weight of the seeds is dependent on the size of the initial seed particles, with smaller particles tending to correspond to a lower weight of seeds per unit reactor volume per unit time.

In an alternative aspect not depicted in the figures, two or more pyrolysis reactors could be utilized with this in situ generated seed particle concept. For instance, in such an aspect, a first pyrolysis reactor can be utilized as outlined above with reference to the system 100 of FIG. 1, where the smaller carbon-containing particles that are recovered therefrom can be utilized as in situ generated seed particles in a second pyrolysis reactor. In such an aspect, the second pyrolysis reactor can optionally include the use of controlled mixing and reduced temperatures to further facilitate the growth of larger carbon-containing particles.

In another aspect, a configuration similar to the optional system 200 in FIG. 1 can be used to create seed particles based on formation of spheroidal molten metal solids. In such aspects, a molten metal saturated with carbon can be slowly cooled and vigorously stirred in a structure similar to holding tank 214, at shear rate conditions greater than those mentioned above for the in situ generation of seed particles. The cooler 212 can be optional in this type of configuration. In such aspects, the holding tank 214 can be in fluid communication with a methane or natural gas source (not shown). The molten metal that is slowly cooled and vigorously stirred can form fine spheroidal solids suspended within the molten metal. These spheroidal solids can act as catalysts for methane conversion into hydrogen and carbon, with the carbon getting trapped in the spheroidal solids by selectively nucleating or adsorbing onto the spheroidal solids. This trapping of carbon on the spheroidal solids can facilitate agglomeration of carbon to form carbon seed particles and/or composite metal and carbon seed particles. The carbon seed particles and/or composite metal and carbon seed particles can then be transported back via conduit 216 to the main pyrolysis reactor vessel 102, where such seed particles can facilitate further growth of carbon-containing particles, e.g., to carbon-containing particles having a characteristic dimension of about 0.2 mm or more.

Additionally or alternatively, seed particles can be heterogeneous seed particles. In aspects, heterogeneous seed particles refer to particles that are distinct from the molten metal, molten salt, or other materials in the general molten media pyrolysis system described above. In aspects, the seed particles can be any type of particle that can facilitate the accumulation of carbon thereon, and that is stable within the molten metal and/or molten salt at the elevated temperatures of the molten metal pyrolysis system disclosed herein. A non-limiting list of seed particles includes carbon-containing particles from fluid coking or fluidized coking, carbides, metal particles, such as metalloporphyrins, ionic liquids, $SiO_2$, $Al_2O_3$, $TiO_2$, $Fe_2O_3$, FeS, $CaCO_3$, $CaSO_4$, or combinations thereof. In various aspects, the size of the seed particles can be chosen based on the density and viscosity of the molten reaction media. In one aspect, the seed particles can have an average characteristic dimension of about 0.5 nanometers (nm) to about 100 microns, about 1 nm to about 80 microns, or, about 1 nm to about 50 microns. In aspects, one or more of the seed particles can be introduced into to the molten metal via a dedicated conduit, along with the methane gas, and/or along with the re-heated recirculating molten salt. In various aspects, the amount of seeds (in grams) per unit reactor volume per unit time that may be added can be in the range of about 0.5 g/m$^3$/min to about 50 g/m$^3$/min. It should be understood that the weight of the seeds is dependent on the size of the initial seed particles, with smaller particles tending to correspond to a lower weight of seeds per unit reactor volume per unit time.

In one aspect, coke particles are efficient heterogeneous seed particles. Without being bound by any particular theory, it is believed that the relative amounts of hydrogen and carbon present in the coke particles provides an environment where polarization from non-uniform electron distribution causes electrostatic attraction and accumulation of elemental carbon onto the coke particles, thereby allowing them to grow into carbon-containing particles having a characteristic dimension of about 0.2 mm or more. In such an aspect, the hydrogen to carbon ratio of the coke particles is about 0.1 or more, about 0.15 or more, or about 0.2 or more. It should be understood that, in certain other aspects, the chemical nature of other seed particles may also provide an electrostatic environment favorable for the accumulation of elemental carbon thereon, such as with the use of $SiO_2$ seeds. The favorable electrostatic environment to accelerate particle growth provides a further complement to the enhanced particle growth due to avoiding the nucleation lag time.

In one or more aspects, carbon-containing particles whose growth has been facilitated by one or more types of heterogeneous seed particles may be characterized as having a core and an outer layer, where the core is of different composition than the outer layer. Stated differently, the carbon-containing particles disclosed herein that have been seeded by one or more heterogeneous seed particles, may have a core that includes the seed particle and an outer layer surrounding the core that includes or substantially includes elemental carbon, such as elemental carbon resulting from the pyrolysis of methane.

As one example, in certain aspects, carbon-containing particles that have been seeded with a coke particle can include a core that includes the coke particle and an outer layer of the elemental carbon from the pyrolysis of methane. In such aspects, the core can have a hydrogen to carbon ratio of at least about 0.1 or more, about 0.15 or more, or about 0.2 or more. Further in such aspects, the outer layer can include elemental carbon, e.g., from the conversion of methane into hydrogen and carbon, where the elemental carbon-containing outer layer has a hydrogen to carbon ratio of about 0.075 or less, about 0.05 or less, or about 0.025 or less.

As another example, in certain aspects, carbon-containing particles that have been seeded with a $SiO_2$ can include a core that includes $SiO_2$ and an outer layer of the elemental carbon from the pyrolysis of methane. In such aspects, the core can comprise about 40% or more of oxygen, or about 50% or more of oxygen. In the same of alternative aspects, the outer layer can comprise about 10% or less of oxygen, about 5% or less of oxygen, or about 1% or less of oxygen.

Increasing Carbon Residence Time in Molten Reaction Environment

Conventionally, the residence time of the carbon-containing particles within the molten media environment can be insufficient to allow the carbon-containing particles to grow to larger, more desirable sizes. The buoyancy force resulting from the high density difference between the molten media (e.g., liquid iron has a density of 6.9 g/mL) and carbon (density of 0.9 g/mL) lifts the carbon-containing particles out of the molten metal layer. Further, the relative low viscosity of the molten media (e.g., liquid iron viscosity is about 5 cP) may not impede carbon particle migration up and out of the molten metal layer. Below in Table 1 are calculations, showing the effect of just the buoyancy force on residence time.

TABLE 1

Theoretical Stokes Velocity Calculations

| Carbon particle size | Stokes Velocity | Stokes Velocity with High Reynolds Number Correction |
|---|---|---|
| 0.1 mm | 0.7 cm/sec | 0.6 cm/sec |
| 1 mm | 69 cm/sec | 11 cm/sec |

As shown in Table 1, as a carbon particle grows, the buoyant force due to the Stokes velocity increases substantially with size. Thus, just as particles are starting to reach a desirable size, rapid increases in the Stokes velocity can force the particle to the surface. This buoyant force is believed to explain in part why the average particle size is only roughly 30 microns in conventional systems. Based on the theoretical calculations of Stoke's velocity, the buoyancy force by itself would limit the residence time of the carbon-containing particles in the molten metal to a few seconds.

In addition, without being bound by any particular theories, it is believed that other forces can further cause a decrease in residence time of the carbon-containing particles in the molten media. For example, without being bound by a particular theory, carbon-containing particles may adhere or cling to fast rising bubbles, e.g., methane of hydrogen bubbles rising, which may have a larger impact on carbon-particle residence time compared to the buoyancy phenomenon discussed above. In such an instance, the rapidly rising bubbles quickly transport such particles to the top of the molten media. In such aspects, the carbon containing particles cling to the bubbles since the carbon-containing particles may have a higher affinity for interacting with the methane or hydrogen than the molten metal, and/or since the carbon-containing particles may be at least partly repelled from interacting with the molten metal and/or molten salt.

In light of the forces resulting in minimal residence times for the carbon-containing particles in the molten metal, various aspects are provided that increase the residence time of the carbon in the molten metal in order to facilitate the growth of larger carbon-containing particles. For instance, in one aspect, a molten metal pyrolysis system and process is provided that increases the carbon particle residence time by suppressing the carbon particle rise velocity. One example of such a molten metal pyrolysis system 300 is depicted in FIG. 2.

Figure 2:
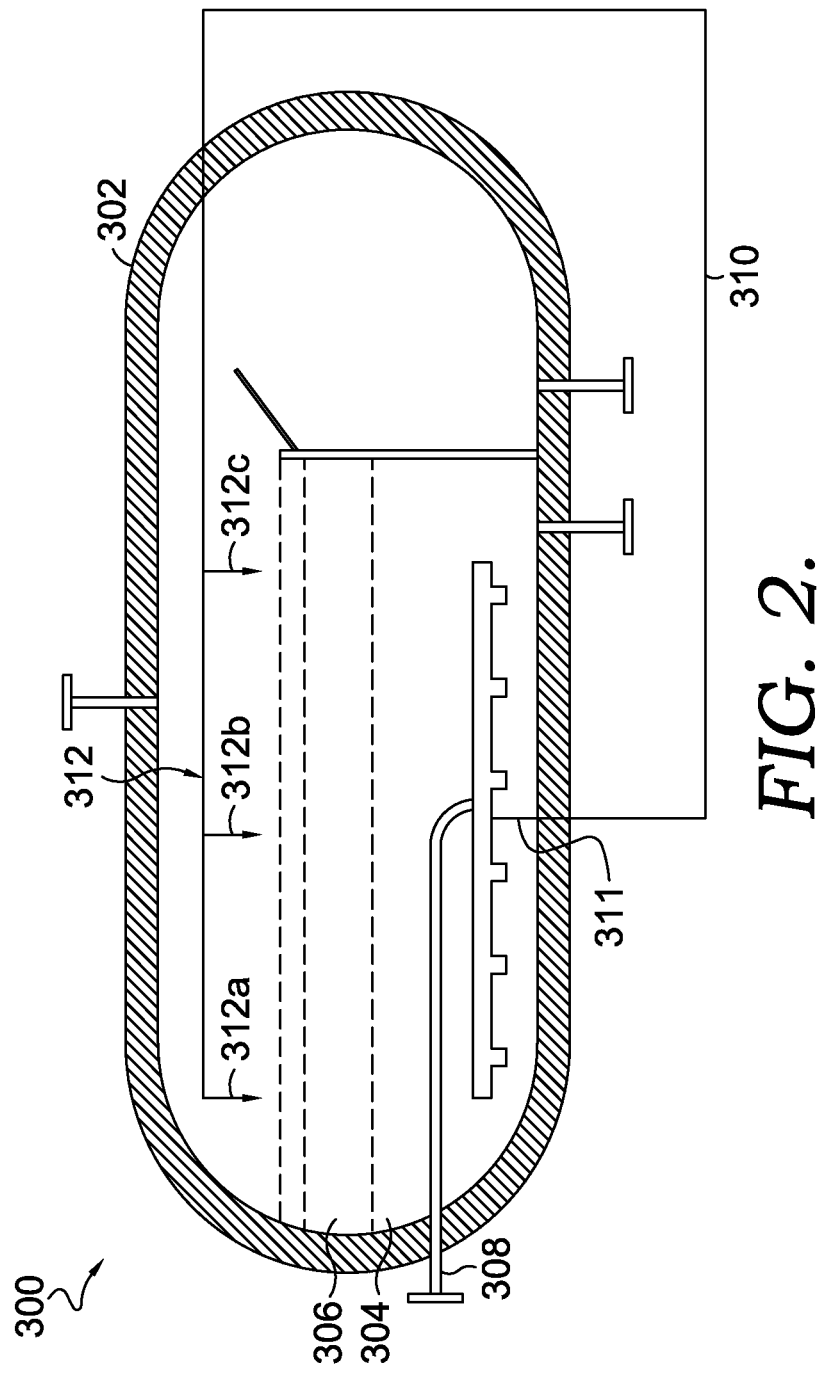
FIG. 2 depicts another example system for molten metal pyrolysis that includes an optional recirculation conduit for recirculating molten metal in the reactor.

As can be seen in FIG. 2, the system 300 can generally include the features of the molten metal pyrolysis system 100 discussed above with reference to FIG. 1. For instance, the system 300 depicted in FIG. 2 can include a pyrolysis reactor vessel 302 having a molten metal layer 304 and a molten salt layer 306 on top of the molten metal layer 304. Further, the system 300 depicted in FIG. 2 includes a conduit 308 coupled to a natural gas or methane source to supply methane to the pyrolysis reactor vessel 302.

The system 300 depicted in FIG. 2 also includes a circulation conduit 310 that is in fluid communication with the molten metal layer 304 at a first end 311 and is in fluid communication with the molten salt layer 306 at a second end 312. While the second end 312 is depicted as being positioned above the molten salt layer 306, it is also contemplated that the second end 312 can be partly or entirely submerged in the molten salt layer 306 or the molten metal layer 304 at a position adjacent the molten salt layer 306.

In aspects, a portion of the molten metal in the molten metal layer 304 can be withdrawn into the first end 311 of the circulation conduit 310 and transferred to the top of the pyrolysis reactor vessel 302 and distributed across the molten salt layer 306, e.g., via a plurality of outlets 312a, 312b, and 312c. In certain aspects, the circulation conduit 310 can be coupled to a pump to recirculate the molten metal from the molten metal layer 304 into the circulation conduit 310 and for transferring to the molten salt layer 306. In one or more aspects, the re-circulation of the molten metal through the circulation conduit 310 can be continuously performed during the operation of the molten metal pyrolysis system 300.

In aspects, this molten metal distributed across the molten salt layer 306 can create a downward liquid flux as the transferred molten metal descends through the molten salt layer 306 and back into the molten metal layer 304. In such aspects, this downward liquid flux created by the recirculation of the molten metal can reduce the net rise velocity of the carbon-containing particles in the molten metal, which, in turn, increases the residence time in the molten metal. Further, in such aspects, this increased residence time can facilitate the further growth of the carbon-containing particles to larger, more manageable sizes.

In certain aspects, the downward liquid flux can reduce the average rise velocity of the carbon-containing particles about 30% or more, about 50% or more, about 80% or more, or about 90% or more, relative to the average rise velocity in the absence of the re-circulation of molten metal to the top of the molten salt layer 306. In the same or alternative aspects, the downward liquid flux can increase the average residence time of the carbon-containing particles by about 5% or more, about 10% or more, or about 30% or more, relative to the average residence time in the absence of the re-circulation of molten metal to the top of the molten salt layer 306. It should be appreciated that the average rise velocity decrease and/or the average residence time increase can be modulated by adjusting the downward liquid flux force, via modulation of the re-circulation rate of the molten metal through the recirculation conduit 310. It should further be appreciated that, while the re-circulation rate can be adjusted to modulate carbon particle velocity and residence time, the re-circulation rate should be kept at a level that does not reverse the flow direction of the bubbles/clinging particles i.e., force the bubbles to move downwards instead of upwards.

In certain aspects, the residence time of the carbon-containing particles can also be increased by selective re-entrainment using a pump impeller. For example, in one aspect, an axial flow pumping impeller can be positioned within the molten metal layer of a molten metal pyrolysis system, e.g., the molten metal pyrolysis system 100 discussed above with reference to FIG. 1, in order to create a top to bottom axial flow that can increase the residence time of the carbon-containing particles.

Figure 3:
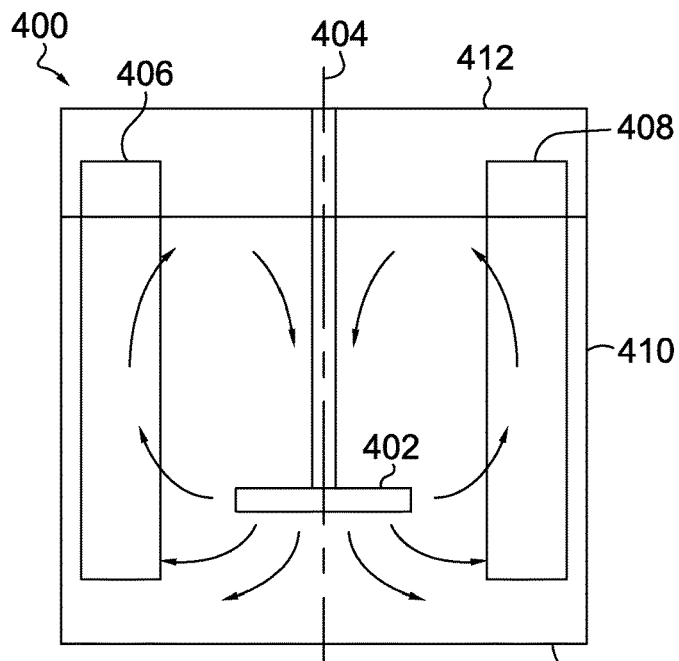
FIG. 3 depicts an example pumping axial flow impeller for use in one or more of the example reactors described herein.

In the aspect depicted in FIG. 3, one example of a pumping axial flow impeller 400 is provided. The impeller 400 depicted in FIG. 3 can include one or more blades 402 that rotate about an axis 404, and one or more baffles 406 and 408. It should be appreciated that the position and/or pitch of the blades 402 (along with the number of blades), and the size and position of the baffles 406 and 408 are chosen to provide a downward axial flow within a reaction vessel. For instance, as can be seen in FIG. 3, the blades 402 are positioned closer to the bottom 411 than the top 412 of the vessel 410. Further, as seen in FIG. 3, the baffles 406 and 408 generally extend in a vertical direction that is similar or substantially similar to the direction of extension of the axis 404. The aspect depicted in FIG. 3 also shows that the baffles 406 and 408 vertically extend over a substantial portion of the height of the vessel 410, defined as the distance between the top 412 and bottom 411 of the vessel 410. In aspects, the baffles 406 and 408 vertically extend over 50% or more, or 60% or more of the height of the vessel 410. In the aspect depicted in FIG. 3, this specific positioning of the blades 402 and of the size and position of the baffles 406 and 408 can create an axial flow within a reaction vessel in order to increase the residence time of the carbon-containing particles in the molten metal layer.

In certain aspects, the impeller 400 depicted in FIG. 3 is adapted to entrain and suspend, within a molten metal layer, carbon-containing particles that are below a threshold size, e.g., carbon-containing particles having an average characteristic dimension of about 0.15 mm or less. Further in such aspects, the impeller 400 would not entrain larger carbon-containing particles, as the buoyancy force is greater for these larger particles among the axial flow created by the impeller 400.

Figure 4:
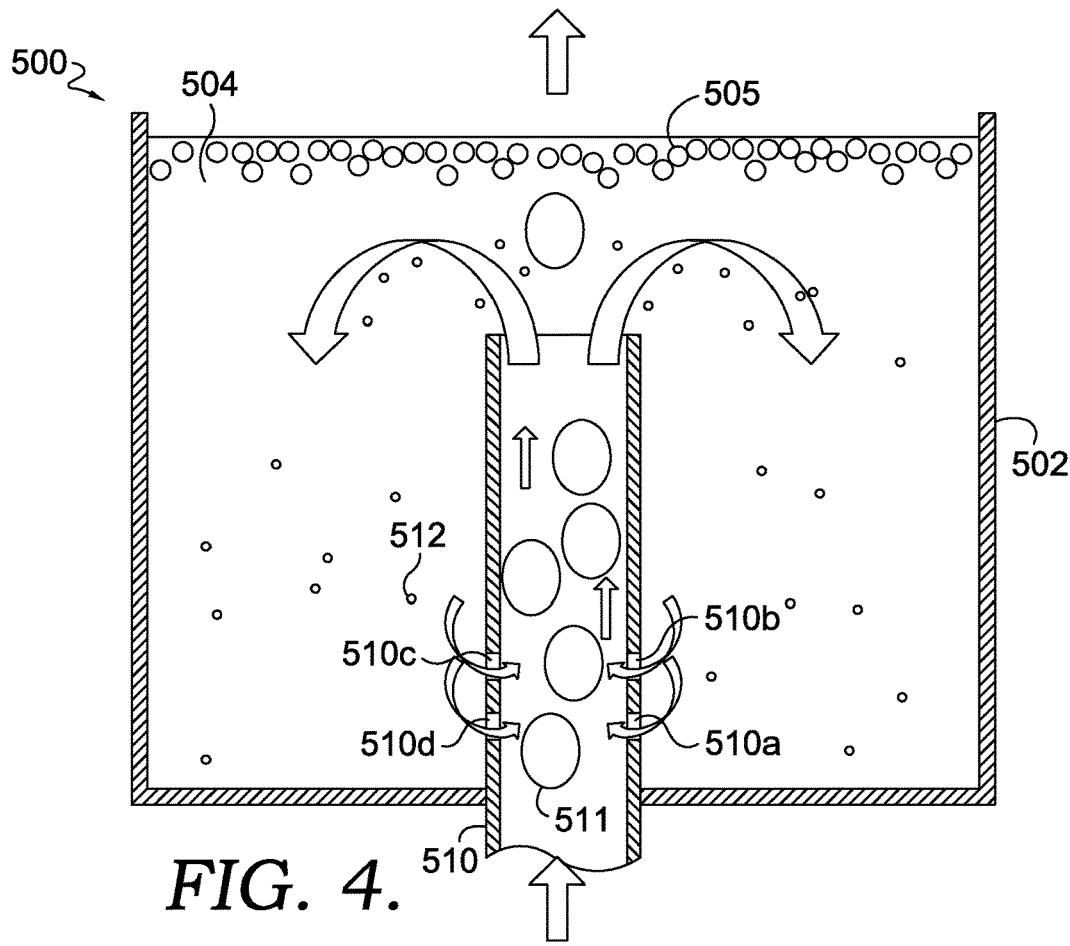
FIG. 4 depicts an example draft pipe for use in one or more of the example reactors described herein.

In certain aspects, in addition to or as an alternative to using impellers to generate liquid currents in the molten metal layer, gas bubbles can be used to generate liquid currents that can entrain smaller carbon-containing particles. FIG. 4 depicts one example system 500 for the use of gas bubbles to create liquid currents within the molten metal layer. The system 500 includes a draft pipe 510 positioned inside of a reaction vessel 502. In aspects, the draft pipe 510 can be all or a portion of a feed tube for providing methane gas inside of the vessel 502, e.g., into a molten metal layer 504.

As can be seen in the aspect depicted in FIG. 4, the draft pipe 510 includes perforations 510a-510d on the sides. In such aspects, as the methane gas (depicted as large bubbles, e.g., bubble 511) travels up through the draft pipe 510 and into the molten metal layer 504, the drag forces created by the methane gas bubbles pulls the molten metal, and suspended carbon-containing particles, e.g., particle 512, through the perforations 510a-510d and up through the draft pipe 510. In such an aspect, this liquid motion creates a current within the reaction vessel 502 that results in increasing the residence time of carbon-containing particles within the molten metal layer 504.

In certain aspects, the draft pipe 510, is adapted to entrain and suspend, within a molten metal layer, carbon-containing particles that are below a threshold size, e.g., carbon-containing particles having a characteristic dimension of about 0.15 mm or less. Further, in such aspects, the draft pipe 510 may not entrain larger carbon-containing particles, e.g., particles having a characteristic dimension of about 0.2 mm or more, as the buoyancy force is greater for these larger particles among the liquid current created by the draft pipe 510 and methane gas passing there through. In such an aspect, the larger carbon-containing particles would accumulate at the top of the molten metal layer 504 as a carbon particle layer 505. It should be understood that, while not depicted in the reaction vessel in FIG. 4, a molten salt layer can also be present on top of the molten metal layer 504.

In various aspects, the draft pipe 510 can be utilized within the systems 100, and 300 discussed above with reference to FIGS. 1 and 2, respectively.

Figure 5:
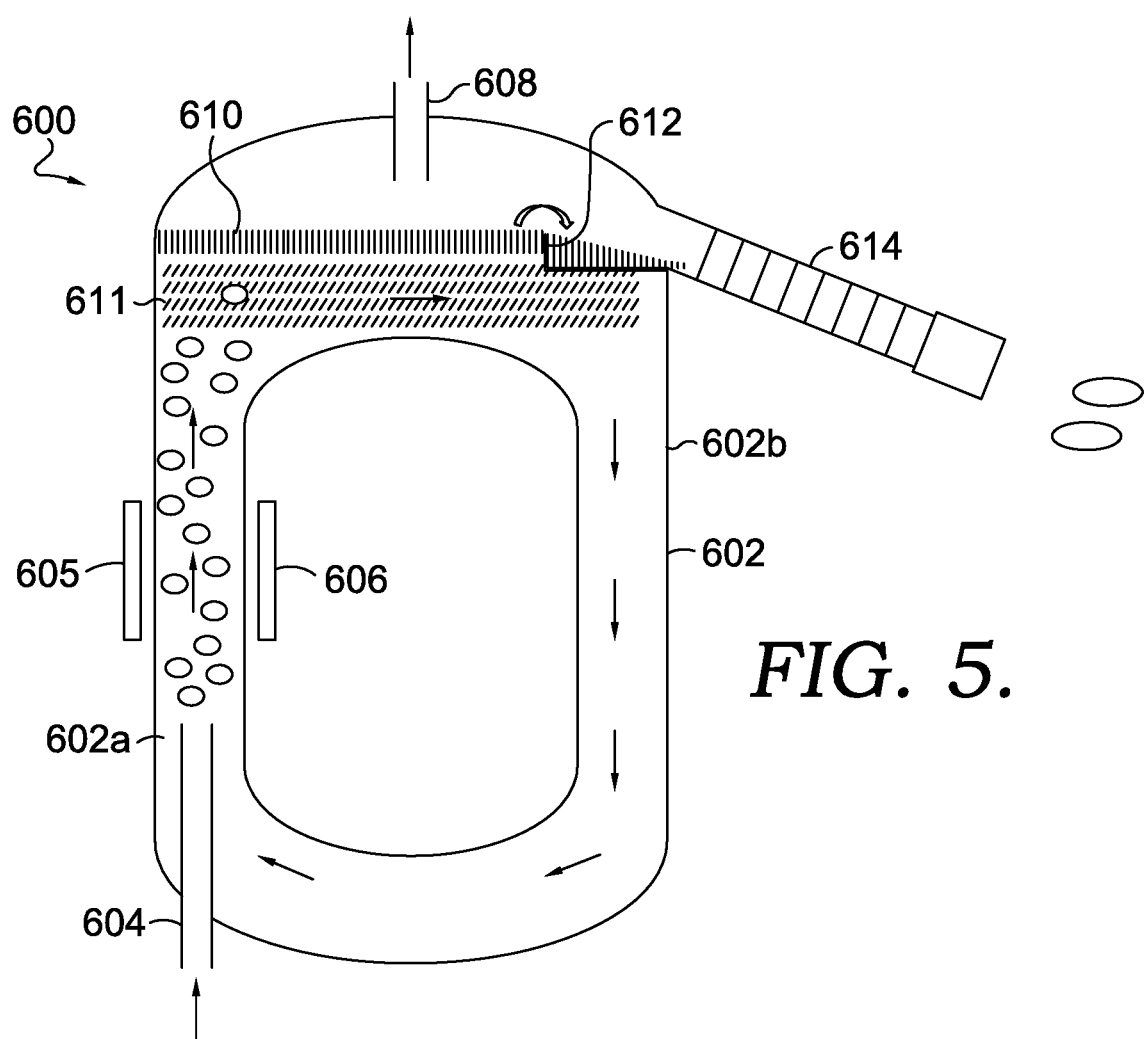
FIG. 5 depicts another example reactor for use in the systems for molten metal pyrolysis described herein.

FIG. 5 depicts another system with an alternative reactor design for molten metal pyrolysis that also utilizes bubbles to create a liquid current within molten metal layer to entrain smaller carbon-containing particles. The system 600 depicted in FIG. 5 includes a reactor vessel 602 having a loop reactor shape. The reactor vessel 602 is coupled to a methane gas or natural gas feed tube 604 that directs gas bubbles up one side 602a of the reaction vessel 602. In this system 600, external thermal energy elements 605 and 606 adjacent to the side 602a of the reactor vessel 602 can be utilized to heat or maintain a specific temperature of the molten metal. In aspects, the system 600 includes a gas outlet 608 for recovery of hydrogen gas generated in the reactor 602.

In aspects, when methane gas bubbles are introduced into the reactor vessel 602 and up into the side 602a, this creates a fluid density difference between the side 602a and the side 602b of the reaction vessel 602. In such aspects, this density difference creates a self-circulation of the molten metal in the direction around the reaction vessel 602 depicted by the arrows. In aspects, the rate of circulation of the molten metal can be controlled by the methane velocity and angle of the methane as it enters the reaction vessel 602. This self-circulation of the molten metal can increase the residence time of the carbon-containing particles, thereby allowing such particles to grow in size such that their buoyancy draws them to the top of the molten metal, thereby forming a carbon particle layer 610 on top of a molten salt layer 611.

In aspects, carbon-containing particles in the carbon particle layer 610 can overflow into an overflow weir 612, where a screw feeder 614 can remove the large carbon-containing particles. In aspects, the screw feeder 614 can be coupled to a polymer blend source, such as a 1% low molecular weight polyethylene in water, which can be injected into the screw feeder 614 to bind together finer carbon-containing particles. In such an aspect, the screw feeder 614 may also be exposed to heat in order to evaporate the water leaving behind a polymer film that can bind the carbon-containing particles allowing for efficient recovery.

Additional Embodiments

Embodiment 1. A process for molten media pyrolysis, comprising: exposing methane gas to molten media and seed particles in a volume of a reaction vessel under effective conditions to convert at least a portion of the methane gas into hydrogen and carbon-containing particles, the carbon-containing particles comprising carbon-containing particles having an average characteristic dimension of 0.2 mm or more; and removing at least a portion of the carbon-containing particles having an average characteristic dimension of 0.2 mm or more.

Embodiment 2. The process of embodiment 1, wherein the carbon-containing particles having an average characteristic dimension of 0.2 mm or more comprise seed particles and carbon.

Embodiment 3. The process of embodiments 1 or 2, wherein the seed particles comprise one or more of: carbon-containing particles from fluid coking or fluidized coking processes used in refineries, carbides, metal particles, such as metalloporphyrins, ionic liquids, $SiO_2$, $Al_2O_3$, $TiO_2$, $Fe_2O_3$, FeS, $CaCO_3$, $CaSO_4$, or a combination thereof.

Embodiment 4. The process of any of embodiments 1-3, wherein the effective conditions comprise the molten media having a temperature range from about 600° C. to about 1100° C.

Embodiment 5. The process of any of embodiments 1-4, a) wherein the molten media comprises a molten metal, wherein the molten metal comprises iron, aluminum, nickel, lead, bismuth, tin, or a combination thereof; b) wherein the molten media comprises a molten salt, wherein the molten salt comprises a salt of iron, nickel, lead, bismuth, tin, or a combination thereof; or c) a combination of a) and b).

Embodiment 6. The process of embodiment 5, wherein the removing at least a portion of the carbon-containing particles having an average characteristic dimension of 0.2 mm or more comprises separating the at least a portion of the carbon-containing particles from the molten salt.

Embodiment 7. The process of any of embodiments 1-6, wherein the carbon-containing particles further comprise carbon-containing particles having an average characteristic dimension of 0.1 mm or less suspended within the molten media.

Embodiment 8. The process of embodiment 7, further comprising: removing at least a portion of the molten metal; reducing the temperature of the at least a portion of the molten metal in a second vessel thereby forming second seed particles, the second seed particles comprising at least a portion of the carbon-containing particles having an average characteristic dimension of 0.1 mm or less; and providing the second seed particles to the molten metal in the volume of the reaction vessel.

Embodiment 9. The process of embodiment 8, wherein the second seed particles comprise metal and carbon, the second seed particles optionally comprising metal spheroids.

Embodiment 10. The process of any of embodiments 1-9, wherein the molten media in the volume of a reaction vessel comprises a molten metal layer.

Embodiment 11. The process of embodiment 10, wherein a molten salt layer is present in the volume of the reaction vessel, and wherein the molten salt layer contacts the molten metal layer, the molten salt layer optionally comprising $MgCl_2$, NaCl, or a combination thereof.

Embodiment 12. A system for molten metal pyrolysis, comprising: a reaction vessel comprising an inner volume having a molten metal present in a first layer and a molten salt present in a second layer, wherein the first layer of the molten metal is positioned between a bottom surface of the reaction vessel and the second layer of the molten salt; a methane gas source in fluid communication with the inner volume of the reaction vessel; a cooling vessel in fluid communication with the reaction vessel, the cooling vessel adapted to receive at least a portion of the molten metal from the reaction vessel and reduce the temperature of the at least a portion of the molten metal; and a conduit in fluid communication with the cooling vessel and with the inner volume of the reaction vessel and adapted to return the at least a portion of the molten metal to the inner volume of the reaction vessel.

Embodiment 13. The system of embodiment 12, further comprising a holding tank, the holding tank in fluid communication with the cooling vessel, the conduit, and the reaction vessel, a mixing apparatus optionally being positioned inside the holding tank.

Embodiment 14. The system of any of embodiments 12-13, wherein the cooling vessel is in fluid communication with the first layer of the molten metal in the reaction vessel.

Embodiment 15. The system of any of embodiments 12-14, a) wherein the molten metal comprises iron, nickel, lead, bismuth, tin, or a combination thereof; b) wherein the molten salt comprises $MgCl_2$, NaCl, or a combination thereof; or c) a combination of a) and b).

Embodiment 16. A carbon-containing composition, comprising: a carbon particle comprising a core and an outer layer, the core comprising a coke particle having a hydrogen to carbon ratio of about 0.1 or more, the outer layer comprising elemental carbon and having a hydrogen to carbon ratio of about 0.05 or less, wherein the carbon particle comprises a characteristic dimension of about 0.2 mm or more.

Embodiment 17. The carbon-containing composition of embodiment 17, wherein the coke particle has a hydrogen to carbon ratio of about 0.2.

Embodiment 18. A carbon-containing composition, comprising: a carbon particle comprising a core and an outer layer, the core comprising SiO2 and having an oxygen content of 40% or more, the outer layer comprising elemental carbon and having an oxygen content of about 5% or less.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A process for molten media pyrolysis, comprising:
exposing methane gas to molten media and seed particles in a volume of a reaction vessel under effective conditions to convert at least a portion of the methane gas into hydrogen and carbon-containing particles, the carbon-containing particles comprising carbon-containing particles having an average characteristic dimension of 0.2 mm or more, the characteristic dimension of a particle being defined as the diameter of the smallest bounding sphere that can contain a particle;
removing, from at least a first portion of the molten media, at least a portion of the carbon-containing particles having an average characteristic dimension of 0.2 mm or more;
transporting at least a second portion of the molten media from the volume of the reaction vessel to a cooling vessel, the at least a second portion of the molten media comprising dissolved carbon;
reducing the temperature of the at least a second portion of the molten media in the cooling vessel to form carbon-containing seed particles having an average characteristic dimension of 0.1 mm or less; and
transporting the carbon-containing seed particles into the molten media in the volume of the reaction vessel, wherein the at least a portion of the carbon-containing particles having an average characteristic dimension of 0.2 mm or more are removed from the volume of the reaction vessel, or wherein the at least a first portion of the molten media is different from the at least a second portion of the molten media.

2. The process of claim 1, wherein the molten media comprises a molten metal, wherein the molten metal comprises iron, aluminum, nickel, lead, bismuth, tin, or a combination thereof.

3. The process of claim 1, wherein the molten media comprises a molten salt, wherein the molten salt comprises a salt of iron, nickel, lead, bismuth, tin, or a combination thereof.

4. The process of claim 3, wherein the at least a first portion of the molten media comprises molten salt, and wherein the removing at least a portion of the carbon-containing particles having an average characteristic dimension of 0.2 mm or more comprises separating the at least a portion of the carbon-containing particles from the molten salt.

5. The process of claim 1, wherein the at least a second portion of the molten media comprises molten media saturated with carbon.

6. The process of claim 1, wherein the at least a second portion of the molten media comprises molten metal.

7. The process of claim 1, wherein the reducing the temperature of the at least a second portion of the molten media to form carbon-containing seed particles further comprises holding the at least a second portion of the molten media in a holding vessel after the reducing the temperature and prior to the transporting the carbon-containing seed particles to the molten media in the volume of the reaction vessel.

8. The process of claim 1, wherein the molten media in the volume of a reaction vessel comprises a molten metal layer.

9. The process of claim 8, wherein a molten salt layer is present in the volume of the reaction vessel, and wherein the molten salt layer contacts the molten metal layer.

10. The process of claim 9, wherein the molten salt layer comprises $MgCl_2$, NaCl, or a combination thereof.

* * * * *